(12) United States Patent
Shi et al.

(10) Patent No.: US 12,501,443 B2
(45) Date of Patent: Dec. 16, 2025

(54) METHOD AND APPARATUS FOR SMALL DATA TRANSMISSION OR RECEPTION

(71) Applicant: Lenovo (Beijing) Limited, Beijing (CN)

(72) Inventors: Jie Shi, Beijing (CN); Haiming Wang, Beijing (CN); Lianhai Wu, Beijing (CN); Ran Yue, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 355 days.

(21) Appl. No.: 18/031,968

(22) PCT Filed: Oct. 16, 2020

(86) PCT No.: PCT/CN2020/121621
§ 371 (c)(1),
(2) Date: Apr. 14, 2023

(87) PCT Pub. No.: WO2022/077476
PCT Pub. Date: Apr. 21, 2022

(65) Prior Publication Data
US 2023/0397215 A1    Dec. 7, 2023

(51) Int. Cl.
*H04W 72/23* (2023.01)
*H04W 74/0833* (2024.01)
*H04W 74/0836* (2024.01)

(52) U.S. Cl.
CPC ....... *H04W 72/23* (2023.01); *H04W 74/0833* (2013.01); *H04W 74/0836* (2024.01)

(58) Field of Classification Search
CPC ............. H04W 72/0453; H04W 72/23; H04W 74/004; H04W 74/0833; H04W 74/0836
(Continued)

(56) References Cited

U.S. PATENT DOCUMENTS

2012/0322457 A1   12/2012  Lee et al.
2016/0014815 A1    1/2016  Vajapeyam et al.
(Continued)

FOREIGN PATENT DOCUMENTS

CN        102572951 A     7/2012
WO      2018233964 A1    12/2018
(Continued)

OTHER PUBLICATIONS

Nokia, "Contention resolution for Connected mode UE", 3GPP TSG-RAN WG2 Meeting #106, R2-1907070, Reno, USA [retrieved May 22, 2023]. Retrieved from the Internet <https://www.3gpp.org/ftp/tsg_ran/WG2_RL2/TSGR2_106/Docs>., May 2019, 3 Pages.
(Continued)

*Primary Examiner* — Robert J Lopata
(74) *Attorney, Agent, or Firm* — FIG. 1 Patents

(57) ABSTRACT

The present disclosure relates to a method and an apparatus for small data transmission or reception. One embodiment of the present disclosure provides a method performed by a user equipment (UE), including: transmitting uplink data in an inactive mode or an idle mode; and receiving a response message which indicates information associated with data to be transmitted or received in the inactive mode or the idle mode.

20 Claims, 9 Drawing Sheets

(58) Field of Classification Search
USPC .......................................................... 370/329
See application file for complete search history.

(56) References Cited

U.S. PATENT DOCUMENTS

| | | |
|---|---|---|
| 2019/0349813 A1 | 11/2019 | Kim et al. |
| 2020/0045569 A1 | 2/2020 | Seo et al. |
| 2021/0100004 A1* | 4/2021 | Yang ...................... H04W 72/21 |
| 2021/0410180 A1* | 12/2021 | Tsai ....................... H04L 1/1819 |
| 2022/0201522 A1* | 6/2022 | Tao ................... H04W 74/0866 |
| 2023/0189213 A1* | 6/2023 | Kim ....................... H04W 72/04 |
| | | 455/458 |
| 2023/0284315 A1* | 9/2023 | Wang ................ H04W 74/0833 |
| | | 370/329 |
| 2023/0319892 A1* | 10/2023 | Zheng .................. H04L 5/0053 |
| | | 370/329 |
| 2023/0354462 A1* | 11/2023 | Jo .......................... H04W 72/02 |
| 2023/0388991 A1* | 11/2023 | Zhang ................ H04W 72/0457 |
| 2024/0090045 A1* | 3/2024 | Agiwal ................. H04W 76/27 |

FOREIGN PATENT DOCUMENTS

| | | |
|---|---|---|
| WO | 2019217829 A1 | 11/2019 |
| WO | 2020034572 A1 | 2/2020 |
| WO | 2020149660 A1 | 7/2020 |

OTHER PUBLICATIONS

PCT/CN2020/121621, "International Preliminary Report on Patentability", PCT Application No. PCT/CN2020/121621, Apr. 27, 2023, 5 pages.
PCT/CN2020/121621, "International Search Report and Written Opinion", PCT Application No. PCT/CN2020/121621, Jul. 21, 2021, 6 pages.
Samsung, "Data transfer in inactive state based on 4-step RACH procedures", 3GPP TSG-RAN WG2 #97, R2-1701529, Athens, Greece [retrieved May 22, 2023]. Retrieved from the Internet <https://www.3gpp.org/ftp/tsg_ran/WG2_RL2/TSGR2_97/Docs/>., Feb. 2017, 7 Pages.
20957254.4, "European Search Report", Application No. 20957254.4, May 8, 2024, 11 pages.
Samsung, "3GPP TSG-RAN2 Meeting #111 Electronic R2-2006772", Random Access based Small Data Transmission—Signaling Flow, Aug. 2020, 6 pages.

* cited by examiner

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |
| R \| Channel Access-CPext \| TPC \| HARQ Feedback Timing Indicator | Oct 7 |
| PUCCH Resource Indicator \| Timing Advance Command | Oct 8 |
| Timing Advance Command | Oct 9 |
| C-RNTI | Oct 10 |
| C-RNTI | Oct 11 |
| UL Grant | Oct 12 |
| UL Grant | Oct 13 |

Fig. 4C

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |
| R \| Channel Access-CPext \| TPC \| HARQ Feedback Timing Indicator | Oct 7 |
| PUCCH Resource Indicator \| Timing Advance Command | Oct 8 |
| Timing Advance Command | Oct 9 |
| C-RNTI | Oct 10 |
| C-RNTI | Oct 11 |
| DL Assignment | Oct 12 |
| DL Assignment | Oct 13 |

Fig. 5C

METHOD AND APPARATUS FOR SMALL DATA TRANSMISSION OR RECEPTION

TECHNICAL FIELD

The present disclosure relates to wireless communication technology, especially to a method and an apparatus for small data transmission or reception.

BACKGROUND OF THE INVENTION

When a user equipment (UE) has multiple subsequent downlink (DL) or uplink (UL) transmission in inactive mode, the legacy RRC release message will transition the UE to inactive mode, and later the legacy RRC resume request message can transition UE to the connected mode when needed.

It is desirable to make the UE perform the DL or UL data transmission over configured grant (CG) resource in inactive mode.

SUMMARY

One embodiment of the present disclosure provides a method performed by a user equipment (UE), including: transmitting uplink data in an inactive mode or an idle mode; and receiving a response message which indicates information associated with data to be transmitted or received in the inactive mode or the idle mode.

In one embodiment of the present disclosure, the uplink data is transmitted by a Msg.A in a two-step random access channel (RACH) procedure, by a Msg.3 in a four-step RACH procedure, or over a configured grant (CG) resource.

In one embodiment of the present disclosure, the information includes one or more resources for physical downlink control channel (PDCCH) monitoring.

In one embodiment of the present disclosure, the one or more resources are related to at least one of one or more data radio bearers (DRB), a UE traffic pattern, or one or more CG resources.

In one embodiment of the present disclosure, the one or more resources includes control resource set (CORESET) information for PDCCH and/or search space information for PDCCH, wherein the search space information includes UE specific search space (USS) and/or common search space (CSS).

In one embodiment of the present disclosure, the one or more resources for PDCCH monitoring are associated with at least one of the following: an initial bandwidth part (BWP) for small data transmission, a BWP where the small data transmission is initialized at, a default BWP, and/or a BWP different from the initial BWP for the small data transmission.

In one embodiment of the present disclosure, the information including one or more resources for PDCCH monitoring is received in a radio resource control (RRC) release message or in a new RRC message when the UE transitions from a connected mode to the inactive mode, the UE transitions from the connected mode to the idle mode, or the UE is in the inactive mode or the idle mode; and wherein the RRC release message or the new RRC message enables the UE in the inactive mode or in the idle mode to transmit or receive data, or transmit or receive data in configured grant (CG) resources.

In one embodiment of the present disclosure, the response message includes an index of resource for PDCCH monitoring.

In one embodiment of the present disclosure, the UE further transmits a first indicator for suggesting a set of resources for PDCCH monitoring.

In one embodiment of the present disclosure, the first indicator is transmitted in a radio resource control (RRC) resume request message, in a medium access control control element (MAC CE) in a random access channel (RACH) procedure, or in a configured grant (CG) resource for small data transmission in the inactive mode or the idle mode.

In one embodiment of the present disclosure, the UE further receives a first timer information which indicates a starting time for PDCCH monitoring when the first timer is expired.

In one embodiment of the present disclosure, the UE further receives a second timer information which indicates an ending time for PDCCH monitoring when the second timer is expired.

In one embodiment of the present disclosure, the UE further receives a second indicator for small data transmission in the inactive mode or in the idle mode, wherein the second indicator is used for UE contention resolution in a random access (RA) procedure, or used for decoding UL or DL scheduling information, wherein the second indicator includes an X-Radio network Temporary Identity (RNTI) and/or UE identity information.

In one embodiment of the present disclosure, the second indicator is received in a RRC release message or in a new RRC message when the UE transitions from connected mode to inactive mode, or when the UE transitions from connected mode to idle mode, or when the UE is in inactive mode or idle mode, or received in a Msg.B in a two-step RACH procedure or a Msg.4 in a four-step RACH procedure, wherein the RRC release message or the new RRC message enables the UE in inactive mode or in idle mode to transmit or receive data, or transmit or receive data in CG resources.

In one embodiment of the present disclosure, the UE further transmits a second indicator for small data transmission in the inactive mode or the idle mode, wherein the second indicator is used for UE contention resolution in a RA procedure, or used for decoding UL or DL scheduling information, wherein the second indicator includes an X-RNTI and/or UE identity information.

In one embodiment of the present disclosure, the second indicator is transmitted in Msg.A in a two-step random access channel (RACH) procedure, or a Msg.3 in a four-step RACH procedure, or a RRC resume request message on a CG resource, or a MAC CE on a CG resource.

In one embodiment of the present disclosure, the response message includes uplink (UL) grant information.

In one embodiment of the present disclosure, a third indicator in subhead of a success random access response (RAR) indicates the availability of the UL grant information, and wherein the UL grant information is a MAC control element (CE) following the success RAR, or the UL grant information is included in a payload of the success RAR.

In one embodiment of the present disclosure, a third indicator in a payload of a success RAR indicates the availability of the UL grant information, and wherein the UL grant information is a MAC CE following the success RAR, or the UL grant information is included in the payload of the success RAR.

In one embodiment of the present disclosure, the UL grant information is used for one shot of UL data transmission, a first number of shots of UL data transmission, more than the first number of shot of UL data transmissions, or for UL data transmission in a duration or in a small data transmission procedure.

In one embodiment of the present disclosure, the response message includes downlink (DL) assignment information.

In one embodiment of the present disclosure, a fourth indicator in subhead of a success RAR indicates the availability of the DL assignment information, and wherein the DL assignment information is a MAC control element (CE) following the success RAR, or the DL assignment information is included in a payload of the success RAR.

In one embodiment of the present disclosure, a fourth indicator in a payload of a success RAR indicates the availability of the DL assignment information, and wherein the DL assignment information is a MAC control element (CE) following the success RAR, or the DL assignment information is included in the payload of the success RAR.

In one embodiment of the present disclosure, the DL assignment information is used for one shot of DL data transmission, a second number of shots of DL data transmissions, more than the second number of shot of DL data transmissions, or for DL data transmission in a duration or in a small data transmission procedure.

In one embodiment of the present disclosure, the UE further transmits an estimated or expected uplink buffer status report (BSR) which is based on logical channel group (LCG) for small data transmission or associated with one or more DRB for small data transmission.

In one embodiment of the present disclosure, the UE further transmits an estimated or expected DL data size which is based on logical channel group (LCG) for small data transmission or associated with one or more DRB for small data transmission or associated with DRB.

In one embodiment of the present disclosure, the UE further indicates, by an upper layer of the UE, an expected or estimated UL buffer status report (BSR) to an access stratum (AS) layer, or an estimated or expected DL data size to the AS layer.

In one embodiment of the present disclosure, the UE further indicates number information for UL small data transmission and/or number information of DL small data transmission by a Msg.A in a two-step random access channel (RACH) procedure, by a Msg.3 in a four-step RACH procedure, or over a configured grant (CG) resource.

In one embodiment of the present disclosure, the number information for UL small data transmission includes the values of 0, 1 to a first number, or larger than the first number; and wherein the number information for DL small data transmission includes the values of 0, 1 to a second number, or larger than the second number.

Another embodiment of the present disclosure provides a method performed by a base station (BS), including: receiving uplink data from a user equipment (UE) in an inactive mode or an idle mode; and transmitting a response message which indicates information associated with data to be transmitted or received in the inactive mode or the idle mode.

In one embodiment of the present disclosure, the uplink data is received by a Msg.A in a two-step random access channel (RACH) procedure, by a Msg.3 in a four-step RACH procedure, or over a configured grant (CG) resource.

In one embodiment of the present disclosure, the information includes one or more resources for Physical Downlink Control Channel (PDCCH) monitoring.

In one embodiment of the present disclosure, the one or more resources are related to at least one of one or more data radio bearers (DRB), a UE traffic pattern, or one or more CG resources.

In one embodiment of the present disclosure, the one or more resources includes control resource set (CORESET) information for PDCCH and/or search space information for PDCCH, wherein the search space information includes UE specific search space (USS) and/or common search space (CSS).

In one embodiment of the present disclosure, the one or more resources for PDCCH monitoring are associated with at least one of the following: an initial bandwidth part (BWP) for small data transmission, a BWP where the small data transmission is initialized at, a default BWP, and/or a BWP different from the initial BWP for the small data transmission.

In one embodiment of the present disclosure, the information including one or more resources for PDCCH monitoring is transmitted in a radio resource control (RRC) release message or in a new RRC message when the UE transitions from a connected mode to the inactive mode, the UE transitions from the connected mode to the idle mode, or the UE is in the inactive mode or the idle mode; and wherein the RRC release message or the new RRC message enables the UE in the inactive mode or in the idle mode to transmit or receive data, or transmit or receive data in configured grant (CG) resources.

In one embodiment of the present disclosure, the response message includes an index of resource for PDCCH monitoring.

In one embodiment of the present disclosure, the BS further receives a first indicator for suggesting a set of resources for PDCCH monitoring.

In one embodiment of the present disclosure, the first indicator is transmitted in a radio resource control (RRC) resume request message, in a medium access control control element (MAC CE) in a random access channel (RACH) procedure, or in a configured grant (CG) resource for small data transmission in the inactive mode or the idle mode.

In one embodiment of the present disclosure, the BS further transmits a first timer information which indicates a starting time for PDCCH monitoring when the first timer is expired.

In one embodiment of the present disclosure, the BS further transmits a second timer information which indicates an ending time for PDCCH monitoring when the second timer is expired.

In one embodiment of the present disclosure, the BS further transmits a second indicator for small data transmission in the inactive mode or in the idle mode, wherein the second indicator is used for UE contention resolution in a random access (RA) procedure, or used for decoding UL or DL scheduling information, wherein the second indicator includes an X-Radio network Temporary Identity (RNTI) and/or UE identity information.

In one embodiment of the present disclosure, the second indicator is transmitted in a RRC release message or in a new RRC message when the UE transitions from connected mode to inactive mode, or when the UE transitions from connected mode to idle mode, or when the UE is in inactive mode or idle mode, or received in a Msg.B in a two-step RACH procedure or a Msg.4 in a four-step RACH procedure, wherein the RRC release message or the new RRC message enables the UE in inactive mode or in idle mode to transmit or receive data, or transmit or receive data in CG resources.

In one embodiment of the present disclosure, the BS further receives a second indicator for small data transmission in the inactive mode or the idle mode, wherein the second indicator is used for UE contention resolution in a RA procedure, or used for decoding UL or DL scheduling information, wherein the second indicator includes an X-RNTI and/or UE identity information.

In one embodiment of the present disclosure, the second indicator is received in Msg.A in a two-step random access channel (RACH) procedure, or a Msg.3 in a four-step RACH procedure, or a RRC resume request message on a CG resource, or a MAC CE on a CG resource.

In one embodiment of the present disclosure, the response message includes uplink (UL) grant information.

In one embodiment of the present disclosure, a third indicator in subhead of a success random access response (RAR) indicates the availability of the UL grant information, and wherein the UL grant information is a MAC control element (CE) following the success RAR, or the UL grant information is included in a payload of the success RAR.

In one embodiment of the present disclosure, a third indicator in a payload of a success RAR indicates the availability of the UL grant information, and wherein the UL grant information is a MAC CE following the success RAR, or the UL grant information is included in the payload of the success RAR.

In one embodiment of the present disclosure, the UL grant information is used for one shot of UL data transmission, a first number of shots of UL data transmission, more than the first number of shot of UL data transmissions, or for UL data transmission in a duration or in a small data transmission procedure.

In one embodiment of the present disclosure, the response message includes downlink (DL) assignment information.

In one embodiment of the present disclosure, a fourth indicator in subhead of a success RAR indicates the availability of the DL assignment information, and wherein the DL assignment information is a MAC control element (CE) following the success RAR, or the DL assignment information is included in a payload of the success RAR.

In one embodiment of the present disclosure, a fourth indicator in a payload of a success RAR indicates the availability of the DL assignment information, and wherein the DL assignment information is a MAC control element (CE) following the success RAR, or the DL assignment information is included in the payload of the success RAR.

In one embodiment of the present disclosure, the DL assignment information is used for one shot of DL data transmission, a second number of shots of DL data transmissions, more than the second number of shot of DL data transmissions, or for DL data transmission in a duration or in a small data transmission procedure.

In one embodiment of the present disclosure, the BS further receives an estimated or expected uplink buffer status report (BSR) which is based on logical channel group (LCG) for small data transmission or associated with one or more DRB for small data transmission.

In one embodiment of the present disclosure, the BS further receives an estimated or expected DL data size which is based on logical channel group (LCG) for small data transmission or associated with one or more DRB for small data transmission or associated with DRB.

In one embodiment of the present disclosure, the BS further receives from an upper layer of the UE, an expected or estimated UL buffer status report (BSR) to an access stratum (AS) layer, or an estimated or expected DL data size to the AS layer.

In one embodiment of the present disclosure, the BS further receives number information for UL small data transmission and/or number information of DL small data transmission by a Msg.A in a two-step random access channel (RACH) procedure, by a Msg.3 in a four-step RACH procedure, or over a configured grant (CG) resource.

In one embodiment of the present disclosure, the number information for UL small data transmission includes the values of 0, 1 to a first number, or larger than the first number; and wherein the number information for DL small data transmission includes the values of 0, 1 to a second number, or larger than the second number.

Yet another embodiment of the present disclosure provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a user equipment (UE), including: transmitting uplink data in an inactive mode or an idle mode; and receiving a response message which indicates information associated with data to be transmitted or received in the inactive mode or the idle mode.

Still another embodiment of the present disclosure provides an apparatus, including: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method performed by a base station (BS), including: receiving uplink data from a user equipment (UE) in an inactive mode or an idle mode; and transmitting a response message which indicates information associated with data to be transmitted or received in the inactive mode or the idle mode.

BRIEF DESCRIPTION OF THE DRAWINGS

FIG. 4C illustrates another structure of a success RAR with UL grant information according to some embodiments of the present disclosure.

FIG. 5C illustrates another structure of a success RAR with DL assignment information according to some embodiments of the present disclosure.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1:
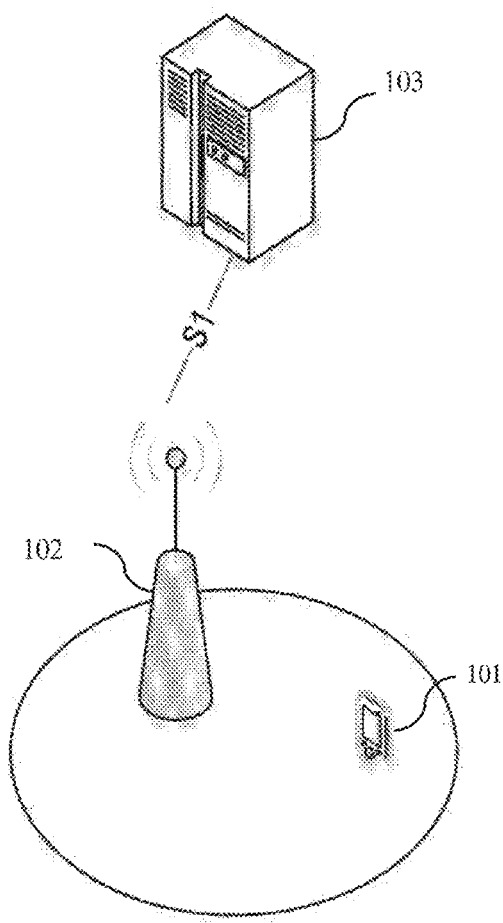
FIG. 1 illustrates a wireless communication system according to some embodiments of the present disclosure.

FIG. 1 illustrates a wireless communication system according to some embodiments of the present disclosure.

As shown in FIG. 1, the wireless communication system can include at least one BS, at least one UE, and a CN node. Although a specific number of BSs and UEs, e.g., a BS (e.g., BS 102) and a UE (UE 101) are depicted in FIG. 1, one skilled in the art will recognize that any number of the BSs and UEs may be included in the wireless communication system.

As shown in FIG. 1, the BS 102 may be distributed over a geographic region and may communicate with the CN node 103 via an interface Si. In an example, the UE 101 can be a LTE UE, the BS 102 can be an eNB, and the CN node 103 can be a mobility management entity (MME) or a serving gateway (S-GW). In an example, the UE 101 is in IDLE mode. When performing small data transmission, the UE 101 connects to the BS 102, and the BS 102 transmits the small data to the CN node 103 via the interface Sl.

Figure 2:
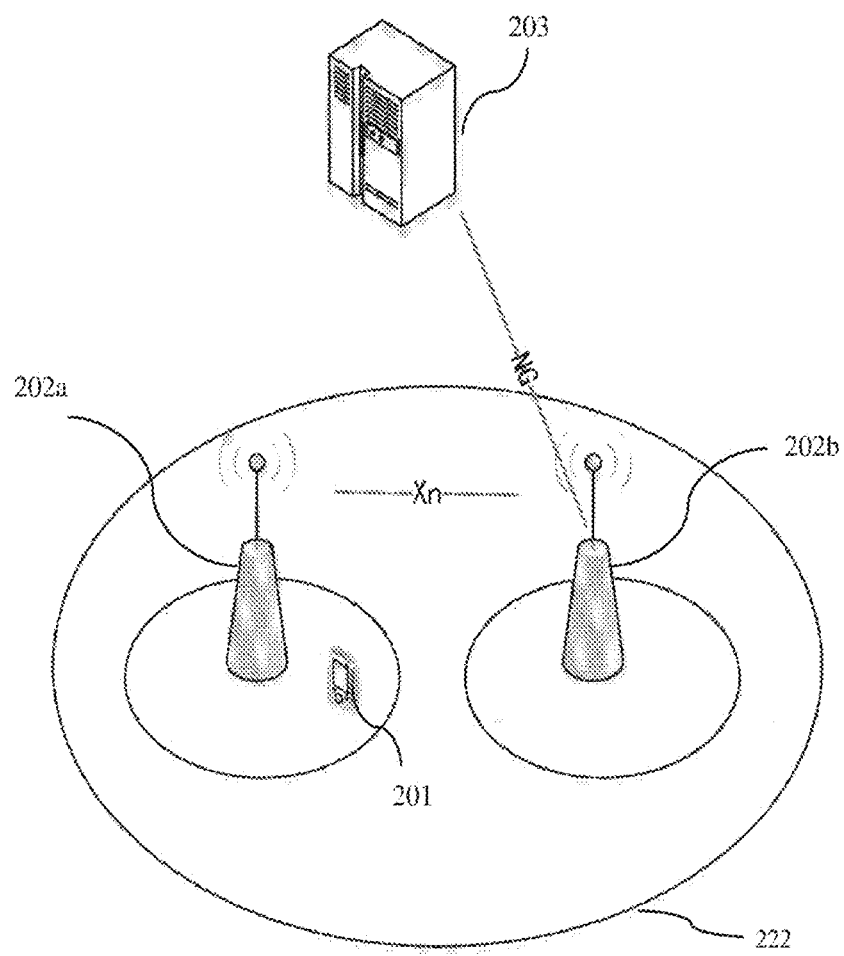
FIG. 2 illustrates another wireless communication system according to some embodiments of the present disclosure.

FIG. 2 illustrates another wireless communication system according to some embodiments of the present disclosure.

As shown in FIG. 2, the wireless communication system can include at least one BS, at least one UE, and a CN node. Although a specific number of BSs and UEs, e.g., two BSs (e.g., BS 202a and BS 202b) and a UE (UE 201) are depicted in FIG. 2, one skilled in the art will recognize that any number of the BSs and UEs may be included in the wireless communication system.

The BS 202a and the BS 202b may be distributed over a geographic region, and they may communicate with each other via an interface Xn. The BS 202a and the BS 202b may communicate with a CN node 203 via an interface NG. In an embodiment of the present disclosure, the CN node 203 may include a mobility management function (AMF) or a user plane function (UPF). In some embodiments of the present disclosure, the BS 202a or the BS 202b may also be referred to as an access point, an access terminal, a base, a base unit, a macro cell, a Node-B, an evolved Node B (eNB), a gNB, a Home Node-B, a relay node, or a device, or described using other terminology used in the art. The BS 202a or the BS 202b is generally part of a radio access network that may include one or more controllers communicably coupled to one or more corresponding BS(s).

The UE 201 may be a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., router, switch, and modem), or the like. According to an embodiment of the present disclosure, the UE 201 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE 201 may be a wearable device, such as a smart watch, a fitness band, an optical head-mounted display, or the like. Moreover, the UE 201 may be referred to as a subscriber unit, a mobile, a mobile station, a user, a terminal, a mobile terminal, a wireless terminal, a fixed terminal, a subscriber station, a user terminal, or a device, or described using other terminology used in the art.

In an example, the UE 201 is in a RRC_INACTIVE state (or inactive mode). The BS 202a and the BS 202b are two gNBs. RRC_INACTIVE state is a state where a UE remains in connection management (CM)-CONNECTED and can move within an area configured by next generation-radio access network (NG-RAN) (that is, RAN notification area (RNA)) without notifying NG-RAN. As shown in FIG. 2, the UE 201 can move within the RNA 222. The BS 202b is the last serving BS of UE 201, and the UE 201 is currently in the cell covered by the BS 202a. For the UE 201 in RRC_INACTIVE state, the BS 202b keeps the context of the UE 201 and the associated NG connection with the CN node 203 (such as, the serving AMF and UPF). The UE 201 in inactive mode may transmit uplink data. For example, the UE 201 may perform small data transmission. In an example, when performing the small data transmission, the BS 202a may transmit the data from the UE 201 to the BS 202b via the interface Xn, and then the BS 202b transmits the data to the CN node 203. In another example, when performing the small data transmission, the BS 202a knows that there is data from the UE 201 to be transmitted, the BS 202a first obtains the context of the UE 201 from the BS 202b and then transmits the data from the UE 201 to the CN node 203.

Currently, the uplink (UL) or downlink (DL) transmission following UL small data transmissions (SDT) without transitioning to RRC_CONNECTED state is supported. When there is an RRC connection between the UE and the BS, the UE is in the RRC_CONNECTED state. When UE is in RRC_INACTIVE state, it may is possible to send multiple UL and DL packets as part of the same SDT mechanism and without transitioning to RRC_CONNECTED on dedicated grant.

Generally, if a UE has multiple subsequent DL or UL transmissions in inactive mode, the legacy RRC release message will make UE be in inactive mode, and later the legacy RRC resume request message can make UE be back to the connected mode when needed.

Therefore, it is desirable to provide a solution for the UE to perform DL or UL transmissions in inactive mode.

In the present disclosure, a new message or a new information indicator in the legacy message is proposed, after UE receives this new message or the new information indicator, the UE will perform the DL or UL transmissions over CG resource or dedicated resource in inactive mode or in idle mode. It should be noted that the inactive mode and idle mode refers to a state the UE is in. The new message or the new information indicator may be included in the Msg.4 in a four-step Random Access Channel (RACH) procedure, or in the Msg. B in a two-step RACH procedure.

Figure 3:
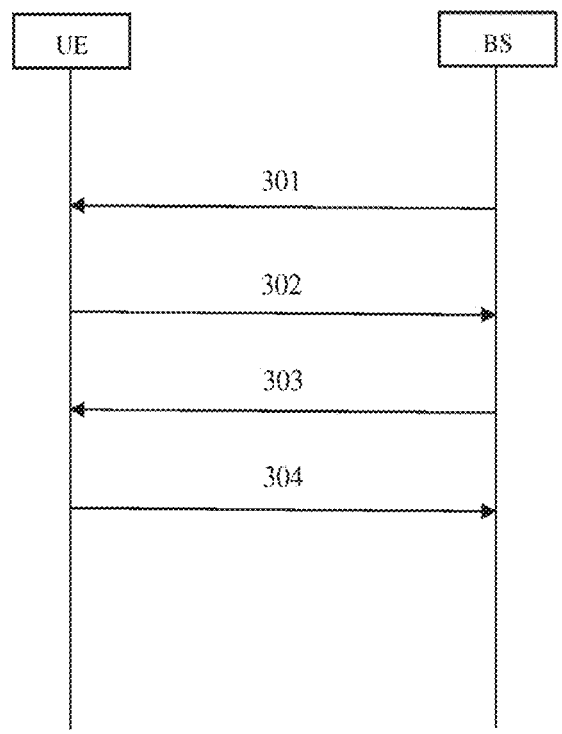
FIG. 3 illustrates a flow chart of small data transmission according to some embodiments of the present disclosure.

FIG. 3 illustrates a flow chart of small data transmission according to some embodiments of the present disclosure.

In step 301, the BS may transmit a RRC release message to the UE. The RRC release message is transmitted to the UE when UE changes from the connected mode to the inactive mode. The RRC release message may include a set of configuration information for the UE in the inactive mode or in the idle mode, for example, the set of configuration information may be a set of resources for PDCCH monitoring. The size of the set may be ranged from zero to a predefined number.

The set of resources for PDCCH monitoring may be UE-specific time resource or frequency resource for PDCCH monitoring which is applied to the UE in inactive mode or idle mode. The set of resources for PDCCH monitoring may be associated with one or more specific data radio bearers (DRB), because the small data transmission is per DRB. The set of resources for PDCCH monitoring may also be control resource set (CORSET) information, which may include a set of physical resources and a set of parameters that is used to carry PDCCH or DCI. The set of resources for PDCCH monitoring may include search space information of PDCCH. The search space may be UE specific search space (USS) or common search space (CSS).

The set of resources for PDCCH monitoring may be associated with bandwidth part (BWP) for the small data transmission. For instance, the set of resources may be associated with the initial BWP, with a BWP where the small data transmission is initialized at, with a default BWP. For another example, the set of resources may be associated with another BWP different from the initial BWP.

Furthermore, the RRC release message may also include one or more timers, which are configured to UE to avoid continuous PDCCH monitoring so as to save UE' power. The timer may be used in the scenario that only one DL or UL subsequent data transmission in addition to the first UL small data transmission.

The one or more timers may include: a starting timer, which indicates the starting time for monitoring the PDCCH for DL data or UL data scheduling. When the starting timer expires, the UE may start the PDCCH monitoring. An ending timer, which indicates the ending time for PDCCH monitoring, when the ending timer expires, the UE may stop the PDCCH monitoring. The PDCCH monitoring refers to monitoring the PDCCH to obtain the DCI information to schedule the subsequent UL or DL data.

The one or more timers may be preconfigured, e.g. in specification, or by the network. The timers may be preconfigured first but not activated, and later activated by the network, or activated once UE receives the associated message.

In addition, an X-Radio network Temporary Identity (RNTI) for the small data transmission in inactive mode or idle mode may also be configured in RRC release message. This X-RNTI could be SDT-RNTI. The X-RNTI is used for UE contention resolution in a random access (RA) procedure, or used for decoding UL or DL scheduling information.

In step 302, the UE may transmit uplink data by a Msg.A in a two-step RACH procedure, by a Msg.3 in a four-step RACH procedure, or over a CG resource. The UE may also transmit one or more suggested resources for PDCCH monitoring to the BS in RRC resume request message or MAC layer in RACH procedure or the CG based small data transmission procedure. The one or more suggested resources for PDCCH may be an index of multiple resources for PDCCH monitoring for UE small data transmission in inactive mode or idle mode.

Furthermore, the X-RNTI as MAC CE may be included in Msg.3, or Msg.A, for the purpose of UE contention resolution, or the X-RNTI may be used to decode the UL or DL scheduling information. By this X-RNTI, the UE and the BS may implicitly know that the UE needs to perform the UL or DL data transmission in inactive mode or in idle mode. Additionally, the UE's identity information may also be included in Msg.3, or Msg.A, for the purpose of UE contention resolution.

In step 303, the BS may transmit a response message with configured resources for PDCCH monitoring with potential downlink data. The response message may be transmitted over CG resources. The message may be Msg.B or Msg.4, or the response message to RRC resume request message. The message may include resources for PDCCH monitoring, which are used for the UE in inactive mode or idle mode. The X-RNTI may be applied in Msg.B or Msg.4, and subsequent UL or DL data transmission to monitor the PDCCH, which is used for UE contention resolution in a RA procedure, or used for decoding UL or DL scheduling information. Additionally, the UE's identity information may also be included in Msg.B or Msg.4, for the purpose of UE contention resolution.

The one or more timers included in the RRC release message may also be included in the response message, similarly, the one or more timers may be preconfigured, or preconfigured and later activated by the network, or activated once UE receives the associated message.

In step 303, the BS may also receive the suggested resources for PDCCH monitoring from the UE, and may choose one or more resources for PDCCH monitoring and indicate the index of resource for PDCCH monitoring to UE. When the UE does not suggest any resources, or the suggested resources are not available, the BS may indicate the index of resource for PDCCH monitoring to UE without considering the suggested resources. The indication may be transmitted in the first message in radio resource control (RRC) layer or by MAC control element (CE). This means that MAC CE could indicate which PDCCH resource is configured to UE, or whether the timer for indicating the starting time or the ending time for PDCCH monitoring.

In step 304, the UE may transmit an acknowledge (ACK) or a non-acknowledge (NACK) on PUCCH to the BS.

In this way, the UE is able to perform the DL or UL data transmission over configured grant (CG) resource in inactive mode or in idle mode.

There are different cases for small data transmission, for example, in a period, the UE may have:
  i. one shot UL data and no DL data;
  ii. no UL data and one shot DL data;
  iii. multiple shots of UL data and no DL data;
  iv. no UL data and multiple shots of DL data;
  v. one shot UL and multiple shots of DL data;
  vi. multiple shots of UL data and one shot DL data;
  vii. multiple shots of UL data and one shot DL data; and
  viii. multiple shots of UL data and multiple shots of DL data.

It should be noted that the above cases are intended to be illustrative, and the present disclosure also applies to other cases.

It can be seen the first case and second case only have one shot UL data or one shot DL data respectively. That is, there is only one extra UL data transmission after the first UL data transmission in RA or CG resource, or there is only one extra DL data transmission. Under this condition, the method illustrated in FIG. 3 is complex and it is unnecessary to configure so many parameter for just one shot DL or UL small data transmission.

Therefore, other solutions for small data transmission in inactive mode or idle mode are proposed in FIGS. 4A-5C.

Figure 4A:
FIG. 4A illustrates a structure of a success random access response (RAR) media access control (MAC) subheader with an indicator for UL grant information according to some embodiments of the present disclosure.

FIG. 4A illustrates a structure of a success RAR MAC subheader with an indicator for UL grant information according to some embodiments of the present disclosure. The subheader consists of eight header fields: which are: E, T1, T2, S, R, R, R, and R.

The field "E" is an extension filed. The extension field is a flag indicating if the MAC sub protocol data unit (PDU) including this MAC subheader is the last MAC subPDU or not in the MAC PDU. The field "T1" is a flag indicating whether the MAC subheader contains a random access preamble ID or T2. The field "T2" is a flag indicating whether the MAC subheader contains a backoff indicator (BI) or a MAC service data unit (SDU) indicator (S). The field "S" indicates whether 'MAC subPDU(s) for MAC SDU' follow the MAC subPDU including this MAC subheader or not.

The field "R" is a reserved bit, and it is set to "0". In FIG. 4A, the first field "R" in the box with dashed lines is used to indicate whether there is indication for the UL grant information.

After the UE reports its subsequent UL data transmission buffer status report (BSR) or UL data assistant information, the BS may configure the UL grant information in Msg.B, in Msg.4, or in the response message for CG based on the small data transmission.

For two-step RACH based small data transmission, in Msg.B, the UL grant information could be an independent MAC CE following the MAC subPDU of the success RAR. The first field "R" in subhead of success RAR will indicate whether this MAC CE is available. For example, in FIG. 4A, the first field "R" in the box with dashed lines is set to a value of "1", which indicates that the MAC CE is following the subPDU of successRAR.

Figure 4B:
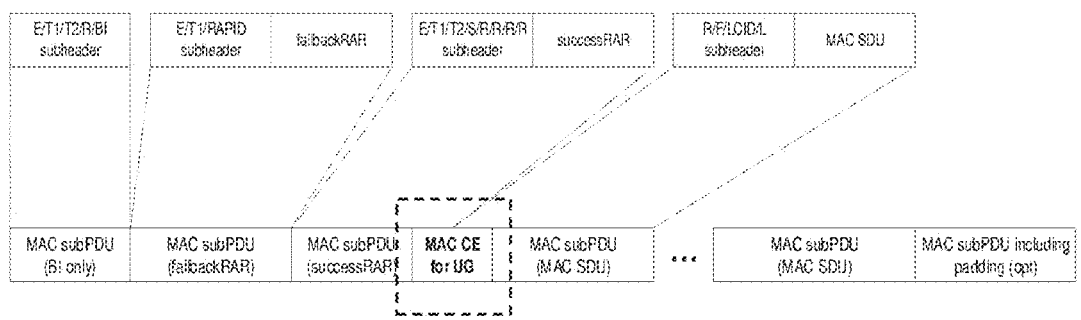
FIG. 4B illustrates a structure of a success RAR with UL grant information according to some embodiments of the present disclosure.

With the first field "R" in the box with dashed lines in FIG. 4A being set to a value of "1", in FIG. 4B, there is a MAC CE for UL grant information following the subPDU of successRAR. If the first field "R" in the box with dashed lines in FIG. 4A is set to a value of "0", then it indicates that there is no MAC CE following the subPDU of successRAR.

Alternatively, the UL grant information could be included in success RAR subPDU in Msg. B. FIG. 4C illustrates such a structure of a success RAR with UL grant information according to some embodiments of the present disclosure.

The first field "R" in subhead of success RAR will indicate whether UL grant information is available in the successRAR payload. With the first field "R" in the box with dashed lines in FIG. 4A being set to a value of "1", in FIG. 4C, the two eight bits in the box with dashed lines i.e. UL grant October 12 (the 12$^{th}$ 8 bit), and UL grant, October 13 (the 13$^{th}$ 8 bit), in the successRAR payload are used for indicating the UL grant information. If the first field "R" in the box with dashed lines in FIG. 4A is set to a value of "0", then it indicates that there is no UL grant information in the successRAR payload.

Instead of using an indicator in the success RAR MAC subheader, another indicator may be included in the payload of the success RAR, to indicate the availability of the UL grant information. For example, in FIG. 4C, the field "R" in October 7 (the 7$^{th}$ 8 bit) may be used for indicating the availability of the UL grant information.

When the indicator in the payload of the success RAR is set to the value of "1", it indicates that the UL grant information is a MAC CE following the success RAR, or the UL grant information is included in the success RAR. When the indicator is set to the value of "0", it indicates that there is no UL grant information.

For four-step RACH procedure and CG based small data transmission, the Msg.4 and the response message for CG based small data transmission may include a MAC CE for UL grant information. The UL grant information may follow the MAC CE for UE contention resolution.

Figure 5A:
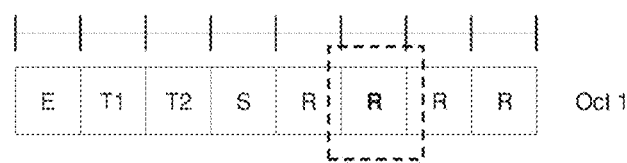
FIG. 5A illustrates a structure of a success RAR MAC subheader with an indicator for DL assignment information according to some embodiments of the present disclosure.

FIG. 5A illustrates a structure of a success RAR MAC subheader with an indicator for DL assignment information according to some embodiments of the present disclosure, and the structure is for the case that the UE only has one shot DL data and no UL data after the Msg.B, Msg.4, or the response message for CG based small data transmission. The subheader consists of eight header fields: which are: E, T1, T2, S, R, R, R, and R. The second field "R" in the box with dashed lines is used to indicate whether there is indication for the DL assignment information.

For two-step RACH based small data transmission, in Msg.B, the DL assignment information could be an independent MAC CE following the MAC subPDU of the success RAR. The second field "R" in subhead of success RAR will indicate whether this MAC CE is available. For example, in FIG. 5A, the second field "R" in the box with dashed lines is set to a value of "1", which indicates that the MAC CE is following the subPDU of successRAR.

Figure 5B:
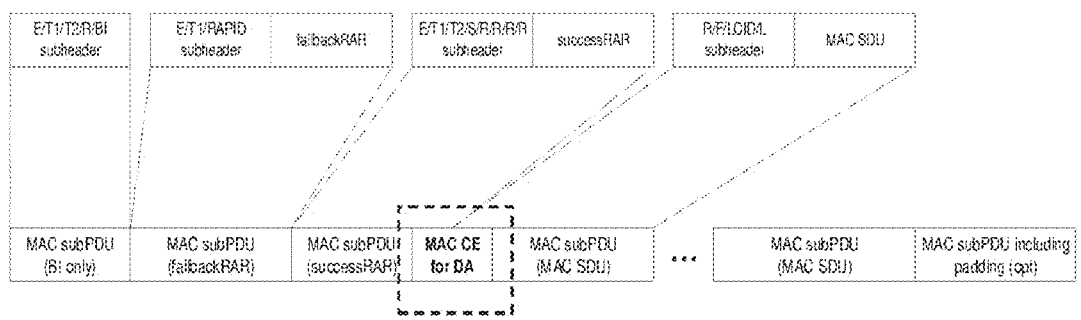
FIG. 5B illustrates a structure of a success RAR with DL assignment information according to some embodiments of the present disclosure.

With the second field "R" in the box with dashed lines in FIG. 5A being set to a value of "1", in FIG. 5B, there is a MAC CE for DL assignment information following the subPDU of successRAR. If the second field "R" bit in the box with dashed lines in FIG. 5A is set to a value of "0", then it indicates that there is no MAC CE following the subPDU of successRAR.

Alternatively, the DL assignment information could be included in success RAR subPDU in Msg. B. FIG. 5C illustrates such a structure of a success RAR with DL assignment information according to some embodiments of the present disclosure.

The second field in subhead of success RAR will indicate whether DL assignment information is available in the successRAR payload. With the second field "R" in the box with dashed lines in FIG. 5A being set to a value of "1", in FIG. 5C, the two eight bits in the box with dashed lines, i.e. DL assignment October 12 (the 12$^{th}$8 bit), and DL assignment, October 13 (the 13th 8 bit), in the successRAR payload are used for indicating the DL assignment information. If the second field "R" in the box with dashed lines in FIG. 5A is set to a value of "0", then it indicates that there is no DL assignment information in the successRAR payload.

Instead of using an indicator in the success RAR MAC subheader, another indicator may be included in the payload of the success RAR, to indicate the availability of the DL assignment information. For example, in FIG. 5C, the field "R" in October 7 (the 7$^{th}$ 8 bit) may be used for indicating the availability of the DL assignment information. When the indicator is set to the value of "1", it indicates that the DL assignment information is a MAC CE following the success RAR, or the DL assignment information is included in the success RAR. When the indicator is set to the value of "0", it indicates that there is no DL assignment information.

For four-step RACH procedure and CG based small data transmission, the Msg.4 and the response message for CG based small data transmission may include a MAC CE for DL assignment information. The DL assignment information may follow the MAC CE for UE contention resolution.

In some embodiment, the UL grant information and the DL assignment information may be indicated at the same time, that is, both the first field "R" and the second field "R" in FIG. 4A are set to the value of "1". In this case, there is a MAC CE for UL grant and a MAC CE for DL assignment, and the MAC CE for UL grant may follow the MAC CE for DL assignment, or the MAC CE for UL grant may precede the MAC CE for DL assignment. Or, they may be located near each other. Similarly, the UL grant bits in the payload of the success RAR may follow the DL assignment bits in the success RAR, or the other way around. Or, they may be located near each other in the payload of the success RAR.

Generally, the size of the UL grant may be 27 bits, the size of the DL assignment may be more than 20 bits. If there is DL assignment in the successRAR of Msg.B, the UL PUCCH resource for this DL assignment may reuse the PUCCH resource in the Msg.B.

Generally, the UL grant information or DL assignment information will also be included in the RRC message in Msg.B of 2-step RACH or Msg.4 of 4-step RACH.

The UL grant information could be indicated to transmit the UL data for one shot, a configured number of shots, or transmit the UL data in a duration, or transmit the UL data in small data transmission procedure, or transmit the DL data until small data transmission procedure is ended. The configured number or the duration could be indicated to UE by network or specified in the UE behavior.

The DL assignment information could be indicated to transmit the DL data for one shot, a configured number of shots, or transmit the DL data in a duration, or transmit the DL data in small data transmission procedure, or transmit the DL data until small data transmission procedure is ended. The configured number or the duration could be indicated to UE by network or specified in the UE behavior.

Base on the solutions of FIGS. 4A-5C, the UE will reduce one PDCCH monitoring for DL assignment or UL grant. This is beneficial for the case that only one subsequent UL data or DL data, then UE will receive the RRC release message after this UL or DL data transmission. There is no other scheduling information needed to be applied to UE.

In one embodiment, the UE may transmit assistant information to the BS in MAC layer, the assistant information is used to indicate the traffic pattern of the UE, in this way, the network may prepare the scheduling information based on the assistant information. For example, the BS may determine the subsequent operation based on the UE traffic pattern, such as: transitioning the UE to connected mode directly, waiting the DL data and transmitting it with RRC release message, or transmitting the RRC response message and scheduling the DL data in inactive mode.

The assistant information of the UE may include the expected or estimated UL BSR, or the expected or estimated DL data size.

The expected or estimated UL BSR indicate the expected or estimated UL BSR based on logical channel group (LCG) for small data transmission in a duration T1. The upper layer of the UE may indicate the expected or estimated UL buffer size for a duration T1 to the access stratum (AS) layer, e.g. the MAC layer.

Similarly, the expected or estimated DL data size may indicate the expected DL data size based on LCG for small data transmission in a duration T2. The upper layer indicates expected or estimated DL data size for a duration T2 to the AS layer, e.g. the MAC layer.

The expected or estimated UL BSR may indicate the expected or estimated UL BSR in a duration T3. The upper layer of the UE may indicate the expected or estimated UL buffer size for a duration T3 to the access stratum (AS) layer, e.g. the MAC layer.

Similarly, the expected or estimated DL data size may indicate the expected DL data size in a duration T4. The upper layer indicates expected or estimated DL data size for a duration T4 to the AS layer, e.g. the MAC layer.

In MAC CE for UE assistant information (such as release assistant information (RAI)) reporting or RRC message, the number of UL data transmissions may be: 0, 1, 2, 2 to A, or more than A, wherein A is an integer number. Or, the number of UL data transmissions may be: 1, 2, 2 to A, or more than A, wherein A is an integer number. The number of DL data transmissions may be: 0, 1, 2, 2 to B, or more than B, wherein B is an integer number. The number of DL data transmissions may be: 0, 1, 2 to B, or more than B, wherein B is an integer number. The values of A or B may be prefigured to the UE, or they may be broadcasted in the network, for example, in the system information block.

In one embodiment, in MAC CE for UE assistant information or RRC message, it will indicate a combination of the number of UL data transmissions and the number of DL data transmissions. For example, one shot UL data transmission and no DL data transmission, or more than A shot UL data transmission and no DL data transmission, In MAC CE for UE assistant information A (such as RAI) reporting or RRC message, the number of subsequent UL data transmissions may be: 0, 1, 1 to C, or more than C, wherein C is an integer number. Or the number of subsequent UL data transmissions may be: 0, 1 to C, or more than C, wherein C is an integer number. Similarly, in the MAC CE or RRC message, the number of subsequent DL data transmissions may be: 0, 1, 1 to D, or more than D, wherein D is an integer number. Or the number of subsequent DL data transmissions may be: 0, 1 to D, or more than D, wherein D is an integer number. The values of C and D may be prefigured to the UE, or they may be broadcasted in the network, for example, in the system information block.

In one embodiment, the MAC CE for UE assistant information or RRC message may indicate a combination of the number of subsequent UL data transmissions and the number of subsequent DL data transmissions. For example, one shot subsequent UL data transmission and no subsequent DL data transmission.

The MAC CE for UE assistant information B reporting (such as RAI) or RRC message may indicate the time period for small data transmission will be larger than duration Tx, or less than Ty. The values of Tx or Ty may be prefigured to the UE, or they may be broadcasted in the network, for example, in the system information block.

In one embodiment, the MAC CE for UE assistant information or RRC message may indicate a combination of UE assistant information A and UE assistant information B.

In one embodiment, 2 bits are configured for depicting the number information of the UL data transmissions, and 2 bits are configured for depicting the number information of the DL data transmissions. Accordingly, 8 codepoints, or 8 indexes are configured by the 4 bits in the MAC CE.

Two exemplary tables showing the relationship between the codepoints or indexes and the number information are shown below:

TABLE 1

| Codepoint/Index for UL | Value |
| --- | --- |
| 00 | one shot UL data transmission |
| 01 | 2-A number of UL data transmission |
| 10 | A + number of UL data transmission |
| 11 | Reserved |

TABLE 2

| Codepoint/Index for DL | Value |
| --- | --- |
| 00 | one shot DL data transmission |
| 01 | 2-B number of DL data transmission |
| 10 | B + number of DL data transmission |
| 11 | Reserved |

It should be noted that the solutions in the present disclosure also apply other mapping relationships between the codepoints or indexes and the number information, and the above tables are just for illustrating, not limiting.

With these codepoints, it is more flexible to indicate the small data transmission traffic pattern. The network may determine whether UE will be in connected mode, inactive mode, or idle mode, based on the possible transmission times of DL or UL data.

Figure 6:
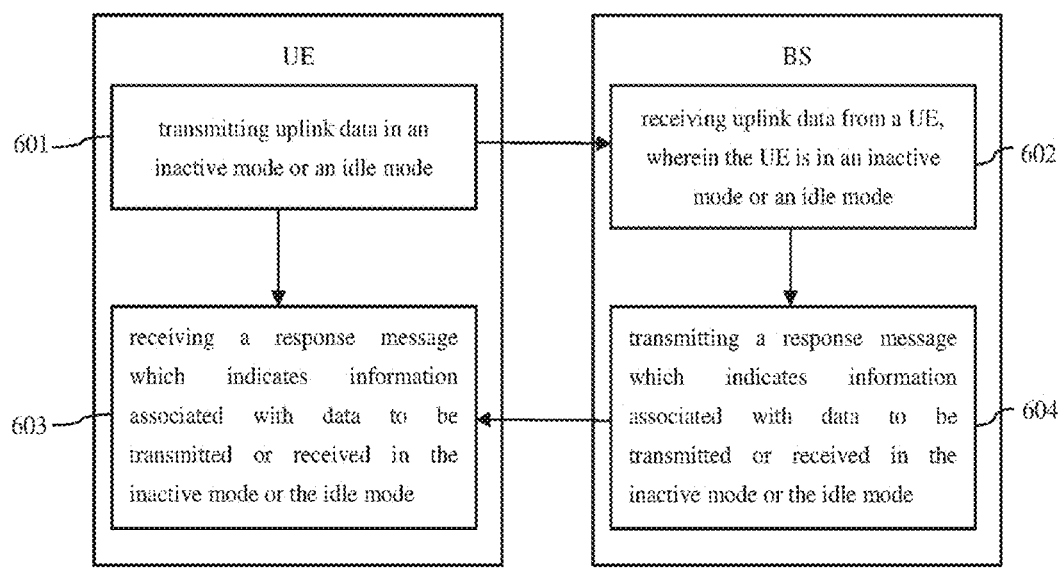
FIG. 6 illustrates a method for small data transmission or reception according to some embodiments of the present disclosure.

FIG. 6 illustrates a method for small data transmission or reception according to some embodiments of the present disclosure.

In step 601, the UE transmits uplink data in an inactive mode or an idle mode, correspondingly, in step 602, the BS receives the uplink data from the UE, wherein the UE is in the inactive mode or the idle mode. In step 603, the UE receives a response message which indicates information associated with data to be transmitted or received in the inactive mode or the idle mode, which is transmitted by the BS in step 604.

The uplink data may be transmitted by a Msg.A in a two-step RACH procedure, by a Msg.3 in a four-step RACH procedure, or over a CG resource. Correspondingly, the BS receives the uplink data by a Msg.A in a two-step RACH procedure, by a Msg.3 in a four-step RACH procedure, or over a CG resource. For example, the uplink data may be transmitted from the UE to the BS in step 302 in FIG. 3. The information may include one or more resources for PDCCH monitoring. The one or more resources for PDCCH monitoring may be relates to a DRB, a UE traffic pattern, or one or more CG resources. The PDCCH monitoring may refer to monitoring the PDCCH to obtain the DCI information to schedule the subsequent UL or DL data.

Furthermore, the one or more resources for PDCCH monitoring may include CORESET information for PDCCH and/or search space information for PDCCH. The search space information may include USS and/or CSS.

The one or more resources for PDCCH monitoring may also be associated with the BWP, for example, the resources may be associated with an initial BWP for small data transmission, a BWP where the small data transmission is initialized at, a default BWP, and/or a BWP different from the initial BWP for the small data transmission.

The UE may receive the information including one or more resources for PDCCH monitoring in different occasions, for example, the UE may receive the information when the UE transitions from a connected mode to the inactive mode, when the UE transitions from the connected mode to the idle mode, or when the UE is in the inactive mode or the idle mode. The RRC release message or the new RRC message may enable to UE in the inactive mode or in the idle mode to transmit or receive data, or transmit or receive data in CG resources.

In some embodiments, the response message may include one or more indexes of resource for PDCCH monitoring. For example, the message transmitted by the BS in step 303 in FIG. 3 may indicate one or more indexes of resource for PDCCH monitoring to the UE.

The UE may suggest a set of resources for PDCCH monitoring, for example, the UE may transmit a first indicator for suggesting a set of resources for PDCCH monitoring in step 302 in FIG. 2. The first indicator may be transmitted in a RRC resume request message, in a MAC CE in a RACH procedure, or in a CG resource for small data transmission in the inactive mode or the idle mode. The first indicator could be transmitted in Msg. A of 2-step RACH procedure or Msg.3 of 4-step RACH procedure. At the BS's side, the BS receives the first indicator in Msg. A of 2-step RACH procedure or Msg.3 of 4-step RACH procedure.

In some embodiments, the UE may receive one or more timers for PDCCH monitoring from the BS. The timers at least include the following two timers: a first timer information which indicates a starting time for PDCCH monitoring when the first timer is expired, that is, when the first timer expires, the UE may start the PDCCH monitoring. A second timer information which indicates an ending time for PDCCH monitoring when the second timer is expired. Namely, when the second timer expires, the UE may stop the PDCCH monitoring. The timer could be preconfigured to UE, or configured by network by broadcast information or dedicated RRC message. The timer will be started by network indication or once UE receives the response message to UL data transmission in UE inactive mode or idle mode, or activated once UE transmits the UL data in UE inactive mode or idle mode.

The UE may further receive X-RNTI and/or UE identity from the BS, which is used for small data transmission in the inactive mode or in the idle mode, and is UE contention resolution in a RA procedure, or used for decoding UL or DL scheduling information. For example, the X-RNTI may be SDT-RNTI. The X-RNTI may be received in a RRC release message or in a new RRC message in the following time points: i) when the UE transitions from connected mode to inactive mode, ii) when the UE transitions from connected mode to idle mode, or iii) when the UE is in inactive mode or idle mode. The X-RNTI may be received in a Msg.B in a two-step RACH procedure or a Msg.4 in a four-step RACH procedure. For instance, the X-RNTI may be received in step 303 in FIG. 3.

The UE may transmit the X-RNTI and/or UE identity to the BS, which is also used for small data transmission in the inactive mode or in the idle mode, and is UE contention resolution in a (RA procedure, or used for decoding UL or DL scheduling information. The XRNTI and/or UE identity may be transmitted in Msg.A in a two-step RACH procedure, or a Msg.3 in a four-step RACH procedure, or a RRC resume request message on a CG resource, or a MAC CE on a CG resource. For example, the UE may transmit the X-RNTI and/or UE identity in step 302 in FIG. 3.

In some embodiment, the response message transmitted in step 303 in FIG. 3 includes UL grant information or DL assignment information. The UL grant information is used for one shot of UL data transmission, a first number of shots of UL data transmission, more than the first number of shot of UL data transmissions, or for UL data transmission in a duration or in a small data transmission procedure. Similarly, the DL assignment information is used for one shot of DL data transmission, a second number of shots of DL data transmissions, more than the second number of shot of DL data transmissions, or for DL data transmission in a duration or in a small data transmission procedure.

Generally, the UL grant information or DL assignment information will also be included in the RRC message in Msg.B of 2-step RACH or Msg.4 of 4-step RACH, which is transmitted from the BS to the UE.

The UL grant information may indicate the UE to transmit the UL data for one shot, a configured number of shots, or transmit the UL data in a duration, or transmit the UL data in small data transmission procedure, or transmit the DL data until small data transmission procedure is ended. The configured number or the duration could be indicated to UE by network or specified in the UE behavior.

The DL assignment information may indicate the UE to transmit the DL data for one shot, a configured number of shots, or transmit the DL data in a duration, or transmit the DL data in small data transmission procedure, or transmit the DL data until small data transmission procedure is ended. The configured number or the duration could be indicated to UE by network or specified in the UE behavior.

In one embodiment, a third indicator in subhead of a success RAR may indicates the availability of the UL grant information, and wherein the UL grant information is a MAC CE following the success RAR, or the UL grant information is included in a payload of the success RAR. For example, the first field "R" in the subhead of a success RAR in FIG. 4A indicates the UL grant information is available in FIG. 4B and FIG. 4C. Alternatively, the third indicator in a payload of a success RAR may indicates the availability of the UL grant information, and wherein the UL grant information is a MAC CE following the success RAR, or the UL grant information is included in the payload of the success RAR.

In another embodiment, a fourth indicator in subhead of a success RAR indicates the availability of the DL assignment information, and wherein the DL assignment information is a MAC control element (CE) following the success RAR, or the DL assignment information is included in a payload of the success RAR. For example, the second field "R" in the subhead of a success RAR in FIG. 5A indicates the UL grant information is available in FIG. 5B and FIG. 5C. Alternatively, the fourth indicator in a payload of a success RAR indicates the availability of the DL assignment information, and wherein the DL assignment information is a MAC CE following the success RAR, or the DL assignment information is included in the payload of the success RAR.

The UL grant MAC CE and DL assignment MAC CE could be near to each other, they will follow the payload of success RAR. The UL grant MAC CE may follow the DL assignment MAC CE, or precede the DL assignment MAC CE.

The reserved bit in success RAR payload could be used to indicate the availability of the DL assignment information or the availability of the UL grant information.

In some embodiment, the UE may transmit some assistant information to the BS, such that the network may prepare the scheduling information. Correspondingly, the BS receives the assistant information, and prepare the scheduling information for the UE.

For example, the UE may transmit the estimated or expected uplink BSR which is based on LCG for small data transmission or associated with one or more DRB for small data transmission, to the BS. The UE may also transmit the estimated or expected DL data size which is based on LCG for small data transmission or associated with one or more DRB for small data transmission or associated with DRB, to the BS. The upper layer of the UE may further indicate the UL BSR to DL data size to the AS layer, for example, the MAC layer.

The assistant information may also include number information for small data transmission and/or number information of DL small data transmission. The UE may indicate the number information to the BS by a Msg.A in a two-step RACH procedure, by a Msg.3 in a four-step RACH procedure, or over a CG resource. For example, the UE may transmit the number information in step 302 in FIG. 3. The number information relates to a range, for example, for UL small data transmission, the number information may include zero time of UL small data transmission, 1 time to a first number of UL small data transmission, or a number larger than the first number of UL small data transmission. Similarly, for DL small data transmission, the number information may include zero time of DL small data transmission, 1 time to a second number of DL small data transmission, or a number larger than the second number of DL small data transmission. The solutions of the present disclosure also apply to other numbers of UL or DL small data transmission, and the above numbers are just for illustrating, not limiting.

The assistant information may also include a combination of the number of UL data transmissions and the number of DL data transmissions. For example, one shot UL data transmission and no DL data transmission, or more than A shot UL data transmission and no DL data transmission, or the like.

In MAC CE for reporting UE assistant information A, e.g. RAI, or RRC message, the number of subsequent UL data transmissions may be: 0, 1, 1 to a third number, or more than the third number. Similarly, in the MAC CE or RRC message, the number of subsequent DL data transmissions may be: 0, 1, 1 to a fourth number, or more than the fourth number. The values of the third number or the fourth number may be prefigured to the UE, or they may be broadcasted in the network, for example, in the system information block.

The assistant information may also indicate a combination of the number of subsequent UL data transmissions and the number of subsequent DL data transmissions. For example, one shot subsequent UL data transmission and no subsequent DL data transmission, or the like.

The MAC CE for reporting UE assistant information B, e.g. RAI, or RRC message may also indicate the time period for small data transmission will be larger than duration Tx, or less than Ty. The values of Tx or Ty may be prefigured to the UE, or they may be broadcasted in the network, for example, in the system information block.

In one embodiment, the MAC CE for UE assistant information or RRC message may indicate a combination of UE assistant information A and UE assistant information B.

Figure 7:
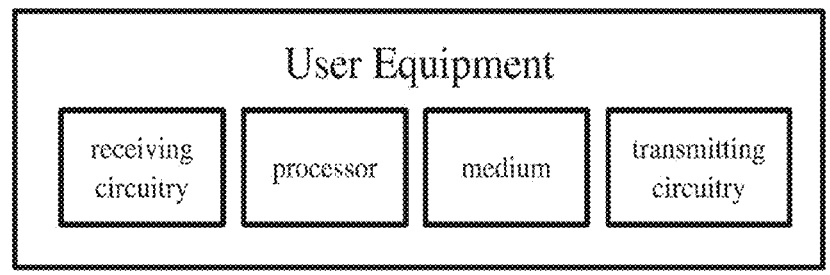
FIG. 7 illustrates a block diagram of a UE according to the embodiments of the present disclosure.

FIG. 7 illustrates a block diagram of a UE according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 6) with the receiving circuitry, the transmitting circuitry and the processor.

Figure 8:
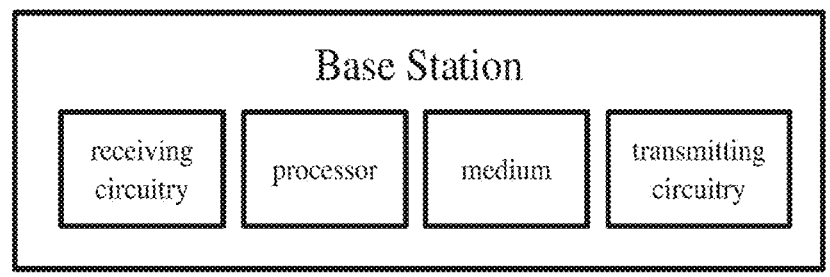
FIG. 8 illustrates a block diagram of a BS according to the embodiments of the present disclosure.

FIG. 8 illustrates a block diagram of a BS according to the embodiments of the subject disclosure.

The BS may include receiving circuitry, a processor, and transmitting circuitry. In one embodiment, the UE may include a non-transitory computer-readable medium having stored thereon computer-executable instructions; receiving circuitry; transmitting circuitry; and a processor coupled to the non-transitory computer-readable medium, the receiving circuitry and the transmitting circuitry. The computer executable instructions can be programmed to implement a method (e.g., the method in FIG. 6) with the receiving circuitry, the transmitting circuitry and the processor.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE), the method comprising:
    transmitting uplink data in an inactive mode or an idle mode;
    transmitting assistant information associated with a small data transmission, wherein the assistant information indicates an uplink buffer status report (BSR) and a downlink data size; and
    receiving a response message which indicates information associated with data to be transmitted or received in the inactive mode or the idle mode, wherein the information includes one or more resources for physical downlink control channel PDCCH) monitoring based at least in part on the assistant information.

2. The method of claim 1, wherein the uplink data is transmitted by a Msg.A in a two-step random access channel (RACH) procedure, by a Msg.3 in a four-step RACH procedure, or over a configured grant (CG) resource.

3. The method of claim 1, wherein:
    the one or more resources are related to at least one of one or more data radio bearers (DRB), a UE traffic pattern, or one or more configured grant (CG) resources; and
    the one or more resources include control resource set (CORESET) information for at least one of PDCCH or search space information for PDCCH, the search space information including at least one of UE specific search space (USS) or common search space (CSS).

4. The method of claim 1, wherein:
    the one or more resources for PDCCH monitoring are associated with at least one of an initial bandwidth part (BWP) for small data transmission, a BWP where the small data transmission is initialized, a default BWP, or a BWP different from the initial BWP for the small data transmission;
    the information including the one or more resources for the PDCCH monitoring is received in a radio resource control (RRC) release message or in a new RRC message when at least one of the UE transitions from a connected mode to the inactive mode, the UE transitions from the connected mode to the idle mode, or the UE is in the inactive mode or the idle mode; and
    the RRC release message or the new RRC message enables the UE in the inactive mode or in the idle mode to transmit or receive the data, or transmit or receive the data in configured grant (CG) resources.

5. The method of claim 1, wherein the response message includes an index of resource for the PDCCH monitoring.

6. The method of claim 1, further comprising:
    transmitting a first indicator that indicates a set of resources for PDCCH monitoring, the first indicator being transmitted in at least one of a radio resource control (RRC) resume request message, in a medium access control control element (MAC CE), in a random access channel (RACH) procedure, or in a configured grant (CG) resource for small data transmission in the inactive mode or the idle mode.

7. The method of claim 1, further comprising:
    receiving a first timer information which indicates a starting time for the PDCCH monitoring when a first timer is expired; and
    receiving a second timer information which indicates an ending time for the PDCCH monitoring when a second timer is expired.

8. The method of claim 1, further comprising:
    receiving an indicator for small data transmission in the inactive mode or in the idle mode, wherein the indicator is used for UE contention resolution in a random access (RA) procedure, or used for decoding uplink (UL) or downlink (DL) scheduling information, the indicator including at least one of an X-radio network temporary identity (RNTI) or UE identity information.

9. The method of claim 1, further comprising:
    transmitting an indicator for small data transmission in the inactive mode or in the idle mode, wherein the indicator is used for UE contention resolution in a random access (RA) procedure, or used for decoding uplink (UL) or downlink (DL) scheduling information, the indicator including at least one of an X-radio network temporary identity (X-RNTI) or UE identity information.

10. A user equipment (UE) for wireless communication, comprising: at least one memory; and at least one processor coupled with the at least one memory and operable to cause the UE to:
   transmit uplink data in an inactive mode or an idle mode;
   receive assistant information associated with a small data transmission, wherein the assistant information indicates an uplink buffer status report (BSR) and a downlink data size; and
   receive a response message which indicates information associated with data to be transmitted or received in the inactive mode or the idle mode, wherein the information includes one or more resources for physical downlink control channel (PDCCH) monitoring based at least in part on the assistant information.

11. The UE of claim 10, wherein the uplink data is transmitted by a Msg.A in a two-step random access channel (RACH) procedure, by a Msg.3 in a four-step RACH procedure, or over a configured grant (CG) resource.

12. The UE of claim 10, wherein:
   the one or more resources are related to at least one of one or more data radio bearers (DRB), a UE traffic pattern, or one or more configured grant (CG) resources; and
   the one or more resources include control resource set (CORESET) information for at least one of PDCCH or search space information for PDCCH, the search space information including at least one of UE specific search space (USS) or common search space (CSS).

13. The UE of claim 10, wherein:
   the one or more resources for the PDCCH monitoring are associated with at least one of an initial bandwidth part (BWP) for small data transmission, a BWP where the small data transmission is initialized, a default BWP, or a BWP different from the initial BWP for the small data transmission;
   the information including the one or more resources for PDCCH monitoring is received in a radio resource control (RRC) release message or in a new RRC message when at least one of the UE transitions from a connected mode to the inactive mode, the UE transitions from the connected mode to the idle mode, or the UE is in the inactive mode or the idle mode; and
   the RRC release message or the new RRC message enables the UE in the inactive mode or in the idle mode to transmit or receive the data, or transmit or receive the data in configured grant (CG) resources.

14. The UE of claim 10, wherein the response message includes an index of resource for PDCCH monitoring.

15. The UE of claim 10, wherein the at least one processor is configured to cause the UE to transmit a first indicator that indicates a set of resources for PDCCH monitoring, the first indicator being transmitted in at least one of a radio resource control (RRC) resume request message, in a medium access control control element (MAC CE), in a random access channel (RACH) procedure, or in a configured grant (CG) resource for small data transmission in the inactive mode or the idle mode.

16. The UE of claim 10, wherein the at least one processor is configured to cause the UE to:
   receive a first timer information which indicates a starting time for PDCCH monitoring when a first timer is expired; and
   receive a second timer information which indicates an ending time for the PDCCH monitoring when a second timer is expired.

17. The UE of claim 10, wherein the at least one processor is configured to cause the apparatus UE to at least one of receive or transmit an indicator for small data transmission in the inactive mode or in the idle mode, wherein the indicator is used for UE contention resolution in a random access (RA) procedure, or used for decoding uplink (UL) or downlink (DL) scheduling information, the indicator including at least one of an X-radio network temporary identity (RNTI) or UE identity information.

18. A base station for wireless communication, comprising:
   at least one memory; and
   at least one processor coupled with the at least one memory and configured to cause the base station to:
      receive uplink data from a user equipment (UE) that is in an inactive mode or an idle mode;
      receive assistant information associated with a small data transmission, wherein the assistant information indicates an uplink buffer status report (BSR) and a downlink data size; and
      transmit a response message which indicates information associated with data to be transmitted or received in the inactive mode or the idle mode of the UE, wherein the information includes one or more resources for physical downlink control channel (PDCCH) monitoring based at least in part on the assistant information.

19. The base station of claim 18, wherein the uplink data is received by a Msg.A in a two-step random access channel (RACH) procedure, by a Msg.3 in a four-step RACH procedure, or over a configured grant (CG) resource.

20. A method performed by a base station, the method comprising:
   receiving uplink data from a user equipment (UE) that is in an inactive mode or an idle mode;
   receiving assistant information associated with a small data transmission, wherein the assistant information indicates an uplink buffer status report (BSR) and a downlink data size; and
   transmitting a response message which indicates information associated with data to be transmitted or received in the inactive mode or the idle mode of the UE, wherein the information includes one or more resources for physical downlink control channel (PDCCH) monitoring based at least in part on the assistant information.

* * * * *